(12) United States Patent
McNeilly et al.

(10) Patent No.: US 11,268,877 B2
(45) Date of Patent: Mar. 8, 2022

(54) PLATE FIN FLUID PROCESSING DEVICE, SYSTEM AND METHOD

(71) Applicant: Chart Energy & Chemicals, Inc., Ball Ground, GA (US)

(72) Inventors: Adam McNeilly, La Crosse, WI (US); Steven J. Vallee, La Crosse, WI (US); Kyle Adams, La Crosse, WI (US); Emma Carter, La Crosse, WI (US); Zeke Skarlupka, Genoa, WI (US); Joseph Vanevenhoven, Stoddard, WI (US); Robert Robson, La Crosse, WI (US)

(73) Assignee: Chart Energy & Chemicals, Inc., Ball Ground, GA (US)

( * ) Notice: Subject to any disclaimer, the term of this patent is extended or adjusted under 35 U.S.C. 154(b) by 399 days.

(21) Appl. No.: 16/169,703

(22) Filed: Oct. 24, 2018

(65) Prior Publication Data
US 2019/0128768 A1    May 2, 2019

Related U.S. Application Data

(60) Provisional application No. 62/640,981, filed on Mar. 9, 2018, provisional application No. 62/579,270, filed on Oct. 31, 2017.

(51) Int. Cl.
*G01M 3/26* (2006.01)
*G01M 3/32* (2006.01)
(Continued)

(52) U.S. Cl.
CPC ......... *G01M 3/3263* (2013.01); *F28D 9/0043* (2013.01); *F28D 9/0062* (2013.01);
(Continued)

(58) Field of Classification Search
CPC .. G01M 3/3263; F28D 9/0062; F28D 9/0043; F28F 27/00; F28F 3/005; F28F 2265/12; F28F 2200/00
See application file for complete search history.

(56) References Cited

U.S. PATENT DOCUMENTS 2,995,028 A * 8/1961 Smith ................. G01M 3/3227
                                                    73/40
3,568,461 A    3/1971 Hoffman
(Continued)

FOREIGN PATENT DOCUMENTS

GB    1484124    8/1977

OTHER PUBLICATIONS

International Search Report and Written Opinion from the international Search Authority for counterpart PCT Application No. PCT/US2018/057577 (dated Feb. 14, 2019), 12 pages.

*Primary Examiner* — Alexander A Mercado
(74) *Attorney, Agent, or Firm* — Cook Alex Ltd.

(57) ABSTRACT

A plate fin fluid processing device includes active layers, where each active layer includes a fin plate sandwiched between parting sheets so that an active fluid space is defined between the parting sheets. The active layers include an outermost active layer having an inlet and an outlet. A contingent layer body is positioned adjacent to the outermost active layer and includes a fin plate positioned between a parting sheet and a cap sheet. The contingent layer body has a fluid space that is sealed with respect to the atmosphere. A pressure monitoring system is in communication with the fluid space of the contingent layer body. An emergency pressure relief device is configured to release a pressure within the fluid space if a preset pressure is exceeded.

11 Claims, 7 Drawing Sheets

(51) Int. Cl.
   *F28D 9/00*     (2006.01)
   *F28F 3/00*     (2006.01)
   *F28F 27/00*    (2006.01)

(52) U.S. Cl.
   CPC .............. *F28F 3/005* (2013.01); *F28F 27/00* (2013.01); *F28F 2200/00* (2013.01); *F28F 2265/12* (2013.01)

(56) References Cited

U.S. PATENT DOCUMENTS

| | | | | |
|---|---|---|---|---|
| 3,590,914 | A * | 7/1971 | Duncan | F28F 3/005 |
| | | | | 165/166 |
| 4,229,868 | A | 10/1980 | Kretzinger | |
| 4,372,897 | A | 2/1983 | Sanderson et al. | |
| 4,434,842 | A | 3/1984 | Gregory | |
| 4,572,766 | A | 2/1986 | Dimitriou | |
| 4,665,975 | A | 5/1987 | Johnston | |
| 5,016,707 | A | 5/1991 | Nguyen | |
| 5,035,284 | A | 7/1991 | Oya et al. | |
| 5,400,854 | A | 3/1995 | Iio et al. | |
| 5,538,700 | A | 7/1996 | Koves | |
| 5,696,872 | A | 12/1997 | Seward | |
| 6,044,692 | A * | 4/2000 | Bowling | G01M 3/188 |
| | | | | 73/40.5 A |
| 6,923,043 | B2 * | 8/2005 | Rabelle | G01M 3/3227 |
| | | | | 73/40 |
| 7,032,654 | B2 | 4/2006 | Wand et al. | |
| 7,051,799 | B2 | 5/2006 | Wu et al. | |
| 7,093,649 | B2 | 8/2006 | Dawson | |
| 7,152,663 | B2 * | 12/2006 | Helin | F28D 9/005 |
| | | | | 165/11.1 |
| 7,454,956 | B1 * | 11/2008 | LoPresti | G01M 3/3227 |
| | | | | 165/11.1 |
| 7,940,189 | B2 | 5/2011 | Brown | |
| 8,261,593 | B1 * | 9/2012 | Sanders | G01M 3/3245 |
| | | | | 73/40.5 R |
| 8,276,393 | B2 | 10/2012 | Critoph | |
| 8,376,036 | B2 | 2/2013 | Kammerzell | |
| 8,746,330 | B2 | 6/2014 | Lyon | |
| 8,985,192 | B2 | 3/2015 | Mitsuhashi et al. | |
| 9,182,176 | B2 | 11/2015 | Sei | |
| 9,618,271 | B2 | 4/2017 | Diem et al. | |
| 9,810,489 | B2 * | 11/2017 | Shigemori | F28D 9/0037 |
| 2001/0018968 | A1 | 9/2001 | Klingler et al. | |
| 2002/0036078 | A1 | 3/2002 | Janezich et al. | |
| 2003/0034146 | A1 * | 2/2003 | Kaufman | G01M 3/3227 |
| | | | | 165/11.1 |
| 2003/0056572 | A1 * | 3/2003 | Werner | G01M 3/228 |
| | | | | 73/40.7 |
| 2004/0129061 | A1 * | 7/2004 | Rabelle | G01M 3/3227 |
| | | | | 73/40 |
| 2006/0288718 | A1 * | 12/2006 | Bradley | F28F 27/00 |
| | | | | 62/228.1 |
| 2007/0125156 | A1 * | 6/2007 | Werner | G01M 3/228 |
| | | | | 73/40.7 |
| 2008/0314073 | A1 * | 12/2008 | Minor | C09K 5/045 |
| | | | | 62/498 |
| 2009/0323285 | A1 | 12/2009 | Ryoson et al. | |
| 2010/0051248 | A1 | 3/2010 | Inatomi et al. | |
| 2010/0263823 | A1 * | 10/2010 | Mitsuhashi | F28F 27/00 |
| | | | | 165/11.1 |
| 2012/0031601 | A1 | 2/2012 | Matter, III et al. | |
| 2012/0111095 | A1 * | 5/2012 | Sheehan | G01M 3/3227 |
| | | | | 73/49.2 |
| 2012/0285667 | A1 | 11/2012 | Maxik et al. | |
| 2014/0054022 | A1 | 2/2014 | Mitsuhashi | |
| 2015/0029658 | A1 | 1/2015 | Yairi et al. | |
| 2015/0260460 | A1 | 9/2015 | Ito | |
| 2016/0109162 | A1 * | 4/2016 | Suzuki | F24F 11/30 |
| | | | | 62/498 |
| 2016/0263703 | A1 | 9/2016 | Eldred et al. | |
| 2019/0368963 | A1 * | 12/2019 | Olsson | F28D 9/005 |

* cited by examiner

PLATE FIN FLUID PROCESSING DEVICE, SYSTEM AND METHOD

CLAIM OF PRIORITY

This application claims the benefit of U.S. Provisional Application No. 62/579,270, filed Oct. 31, 2017, and U.S. Provisional Application No. 62/640,981, filed Mar. 9, 2018, the contents of both of which are hereby incorporated by reference.

FIELD OF THE DISCLOSURE

The present subject matter relates generally to fluid processing devices and, in particular, to a plate fin fluid processing device and system having a leak detection system and method of operation of the system.

BACKGROUND

Compact plate fin fluid processing devices are characterized by their high "area density" in that they have a high ratio of heat transfer surface to heat exchanger volume. As a result, they are popular for use as heat exchangers where process fluids are heated or cooled or as reactors where process streams encounter catalysts positioned within the device. The two functions may be combined in some fluid processing applications.

In a plate fin heat exchanger, a stack of plates is assembled with fin sheets, fin plates or fins between otherwise adjacent plates so that the stack of plates separate different fluid streams. The fin plates add to the strength of the structure and may be provided with perforations or serrations to provide additional flow paths for the fluids.

A simplified example of the core of a prior art plate fin fluid processing device is indicated in general at 20 in FIG. 1. The plate fin device basically uses the technology of the brazed aluminum heat exchangers (BAHX) and reactors of Chart Energy & Chemicals, Inc. of La Crosse, Wis. More specifically, as illustrated in FIG. 1, the device is constructed by stacking corrugated fins, illustrated at 22a-22c, separated by parting sheets or plates 24a and 24b and sealed along the edges with side or end bars 26a-26f. Cap sheets 28a and 28b form exterior surfaces of the structure. All of the components are typically constructed from aluminum, and the assembly is brazed in a vacuum furnace to form an integral, rigid block, body or core.

FIG. 1 provides a simplified illustration in that the core of the plate fin heat exchanger typically features many more than the three layers illustrated.

As illustrated by arrows 32a and 32b, fluids may flow in a first direction through fins 22a and 22c, while a fluid may flow through fins 22b in a second direction that, as illustrated by arrow 34, is transverse to the direction of arrows 32a and 32b. The fins 22b of FIG. 1 may alternatively be configured in the manner indicated in general at 22b' in FIG. 2 to include fins 36 that run parallel to the fins 22a and 22c so that the flow through a portion of fins 22b' may be countercurrent to the flows through fins 22a and 22c. Of course other flow directions are known in the art.

A second example of a heat exchanger core is indicated in general at 40 in FIG. 3, where the corresponding components use the same numbering as in FIG. 1. As illustrated in FIG. 2 (at 38a and 38b) and FIG. 3 (at 42a-42e) headers having nozzles (44a and 44b in FIG. 2, 46a-46e in FIG. 3) are placed over the open ends of the fin sheets, and fluid piping is connected to the nozzles to direct fluid flow to, and receive fluid flow from, the layers.

It is known in the prior art to include inactive layers running parallel to the directions of fluid flow of the active layers on top and bottom of the stack of the heat exchanger. For example, an additional fin plate that is inactive and an additional parting sheet would be provided between the cap sheet 28a and the outermost active fin plate 22a of FIG. 1 (with the inactive fin plate sandwiched between cap sheet 28a and the additional parting sheet). Similarly, an additional fin plate that is inactive and an additional parting sheet would be provided between the cap sheet 28b and the fin plate 22c of FIG. 1 (with the inactive fin plate sandwiched between cap sheet 28b and the additional parting sheet). Each of these inactive layers is provided with end bars and at least one header and nozzle for pressure testing. The nozzle opening is typically sealed off after pressure testing with a temporary plug to keep moisture and debris out of the inactive area during shipping and storage. The plug is removed for operation to prevent pressure buildup.

The inactive layers protect the active layers of the heat exchanger from external forces and impacts, such as those that may occur during transport and installation. The inactive layers may also provide increased surface area for the core for attaching headers and other fixtures.

Near the end of the life of a heat exchanger, fluid leaks may develop, especially in the cap sheets or in the outermost active layers. It is desirable to predict such fluid leaks prior to their formation, as well as detect leaks during operation to notify the operator of such leaks so that repair or replacement of the heat exchanger may be accomplished.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a plate fin fluid processing device includes a number of active layers, where each active layer includes a fin plate sandwiched between parting sheets so that an active fluid space is defined between the parting sheets. The plurality of active layers includes an outermost active layer having an inlet and an outlet. A contingent layer body is positioned adjacent to the outermost active layer and includes a fin plate positioned between a parting sheet and a cap sheet. The contingent layer body has a fluid space that is sealed with respect to the atmosphere and contains an inert gas at a predetermined pressure that is above or below atmospheric pressure. A pressure monitoring system is in communication with the fluid space of the contingent layer body. An emergency pressure relief device is configured to release a pressure within the fluid space if a preset pressure is exceeded.

In another aspect, a method for detecting a leak of a plate fin fluid processing device, where the plate fin fluid processing device has a number of active layers, with each active layer including a fin plate sandwiched between parting sheets so that an active fluid space is defined between the parting sheets and where the number of active layers includes an outermost active layer having an inlet and an outlet, includes the steps of storing an inert gas at a predetermined pressure that is above or below atmospheric pressure within a contingent layer body positioned adjacent to the outermost active layer; detecting an increase or a decrease in a pressure in the contingent layer body; and signaling an operator that the increase or decrease in pressure in the contingent layer body has occurred.

In still another aspect, a plate fin fluid processing device includes a number of active layers. Each active layer includes a fin plate sandwiched between parting sheets so that an active fluid space is defined between the parting sheets. The number of active layers includes an outermost active layer having an inlet and an outlet. A contingent layer body is positioned adjacent to the outermost active layer. The contingent layer body includes a fin plate positioned between a parting sheet and a cap sheet and has a fluid space that is sealed with respect to the atmosphere and a design pressure that is approximately equal to or greater than a design pressure of the outermost active layer. A first pressure relief device is in fluid communication with the fluid space of the contingent layer body. A pressure monitoring system is in communication with the fluid space of the contingent layer body and configured to constantly measure a pressure within the fluid space. A signaling device is connected to the pressure monitoring system and is activated when a pressure within the fluid space exceeds a predetermined level.

DETAILED DESCRIPTION

Examples of constructions suitable for use in embodiments of the fluid processing device of the disclosure are presented in commonly owned U.S. Pat. Nos. 6,510,894 and 6,736,201, both to Watton et al., U.S. Pat. No. 7,998,345 to Jia et al. and U.S. Pat. No. 5,193,611 to Hesselgreaves, the contents of each of which are hereby incorporated by reference.

While the embodiments below are described in terms of heat exchangers, it is to be understood that the fluid processing device of the disclosure may also be incorporated into reactors or other fluid processing applications.

Furthermore, while corrugated fin plates are illustrated, the fins may take on other shapes known in the art including, as examples only, herringbone or chevron shaped fins.

It has been discovered by the inventors that, in many circumstances, outside inactive layers of a plate fin heat exchanger are likely to have undesirable fluid communication through the outside cap sheet of an inactive layer before having undesirable fluid communication through the internal parting sheets of active layers.

Figure 1:
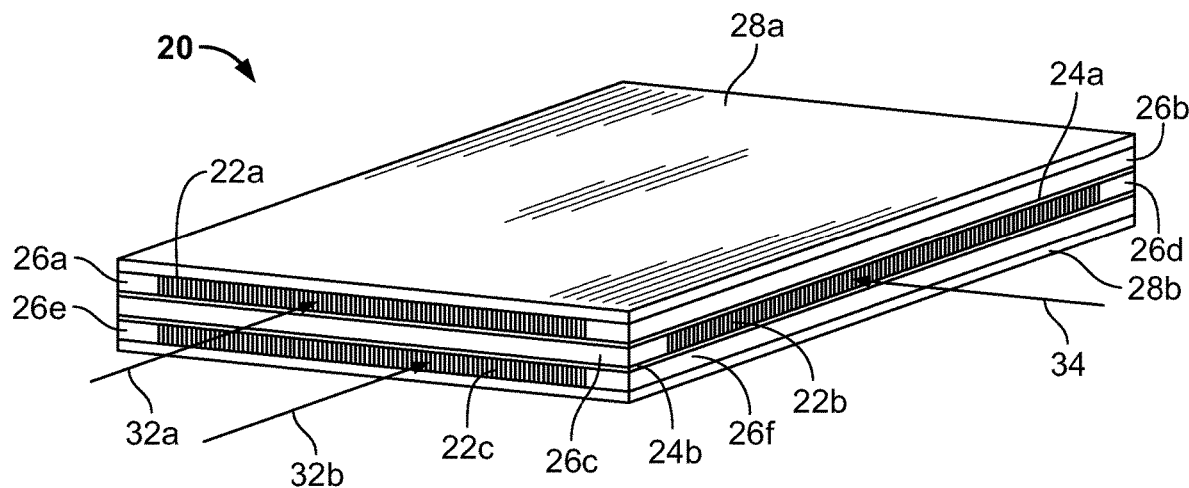
FIG. 1 is a perspective view of a prior art core or body of a plate fin fluid processing device.
Figure 2:
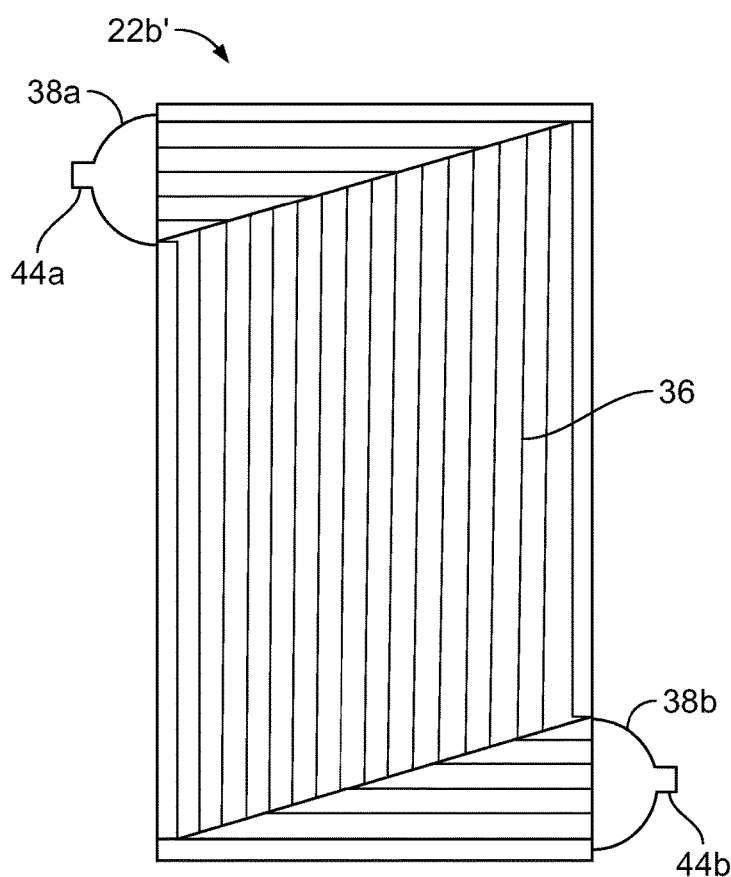
FIG. 2 is a top elevational view of a fin plate, side bars, headers and nozzles of a prior art plate fin fluid processing device.
Figure 3:
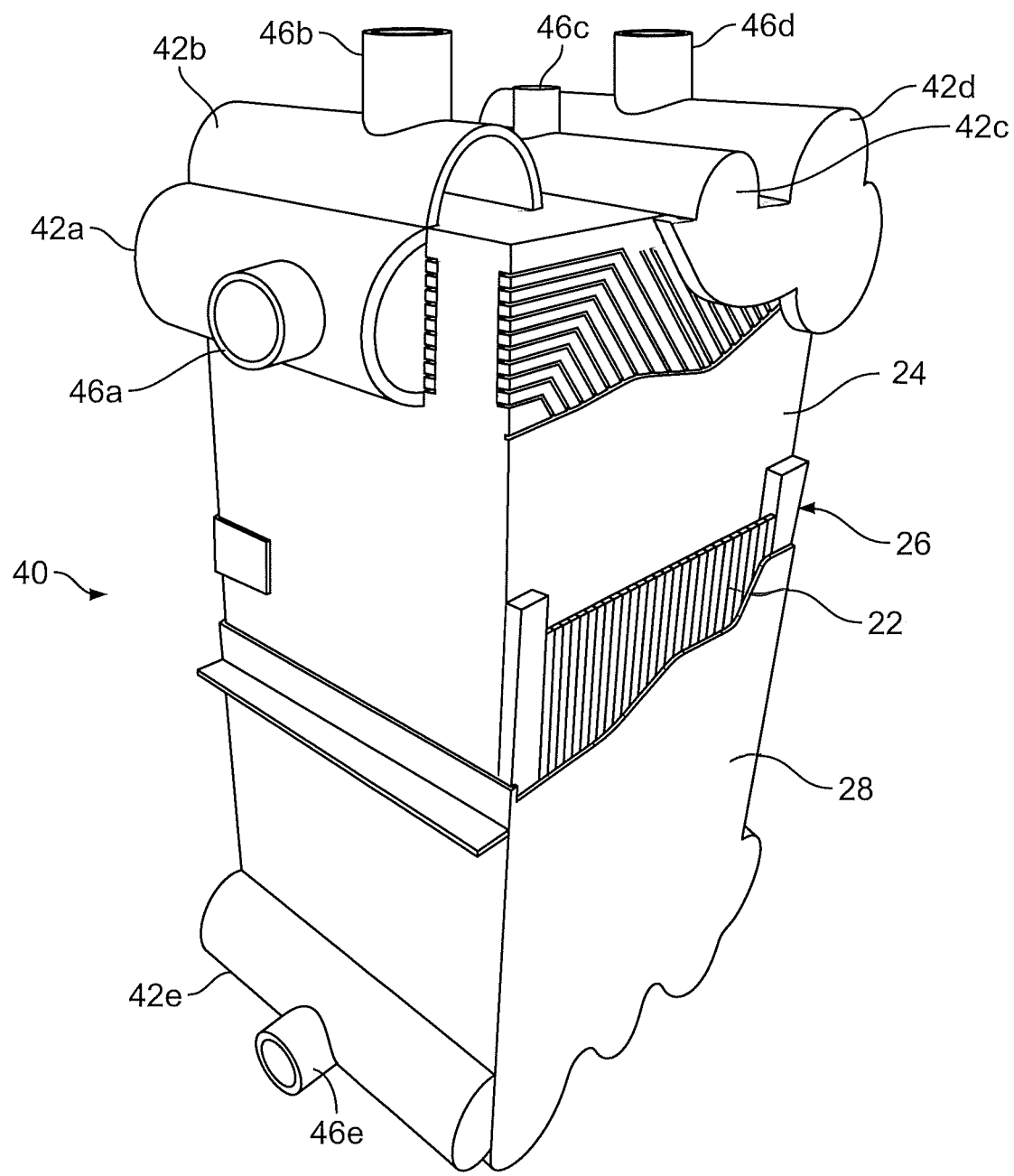
FIG. 3 is perspective view of a prior art plate fin fluid processing device.
Figure 4:
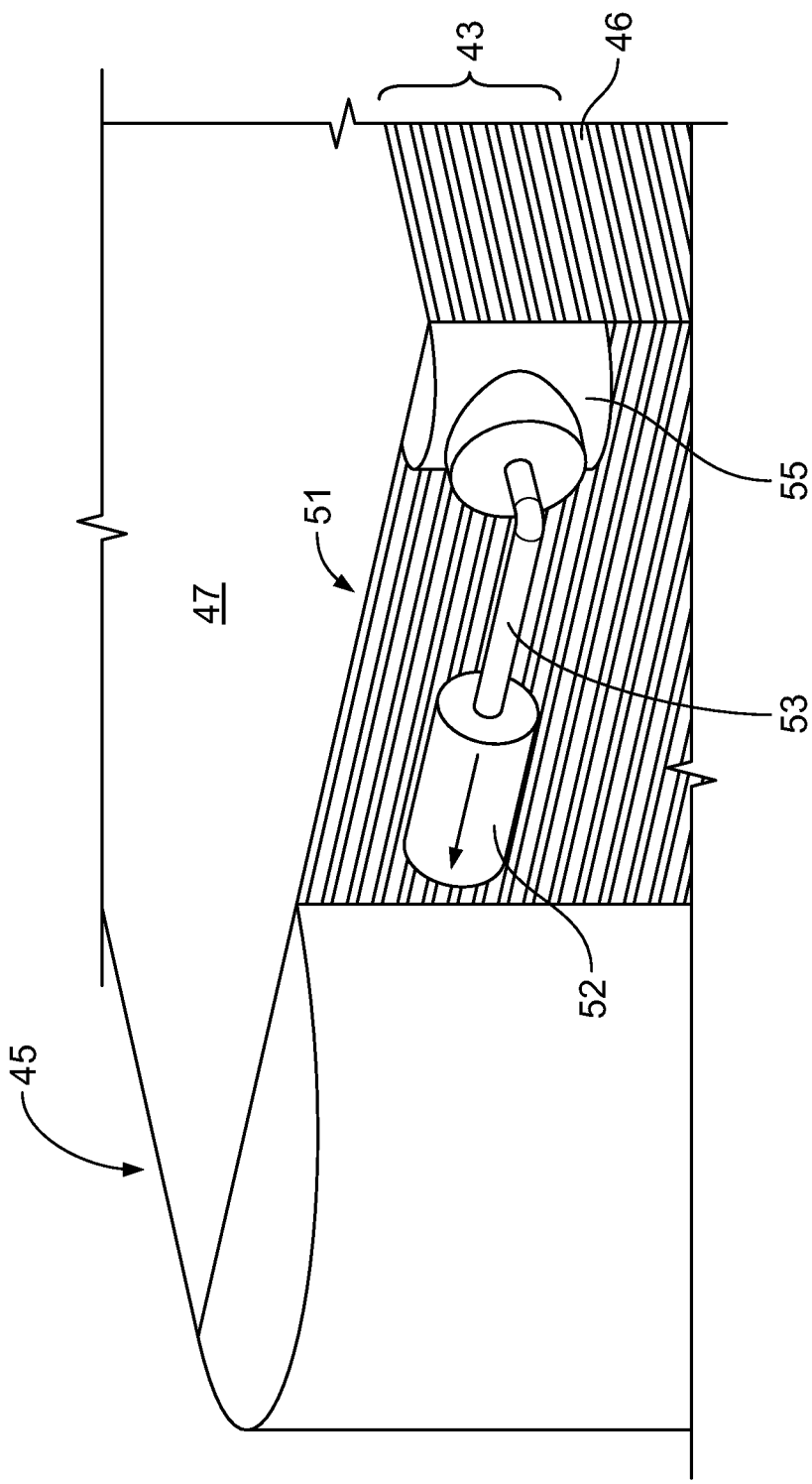
FIG. 4 is a partial perspective view of a first embodiment of the plate fin fluid processing device of the disclosure.

In an embodiment of the plate fin fluid processing device of the disclosure, illustrated in FIG. 4, the inactive layers 43 of a plate fin heat exchanger, indicated in general at 45, make up a contingent layer body and define a fluid space that is sealed with respect to the atmosphere and pressurized with an inert gas to a predetermined pressure, such as approximately 100 psi (as an example only). The predetermined pressure is preferably selected to be a pressure above ambient but below the operating pressure of the stream of the outermost active layer 46. As an example only, nitrogen may be used to pressurize the fluid space of the contingent layer body or inactive layers 43, but alternative inert gases, including, but not limited to, dry air (which includes generally dry air), may be selected.

In the event that thermal stress or accumulated thermal fatigue damage causes a crack to form in the outside cap sheet 47 (FIG. 4), the inert gas in at least the outermost inactive layer 43 escapes through the crack and the pressure in the inactive layer(s) drops.

Figure 5:
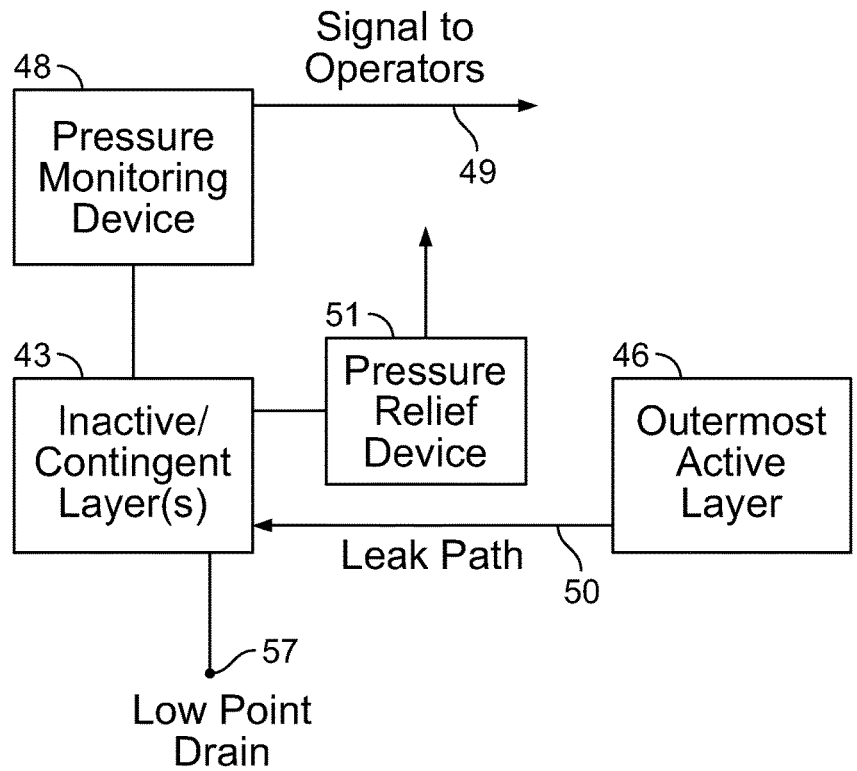
FIG. 5 is a schematic of a first embodiment of the plate fin fluid processing system of the disclosure including the plate fin fluid processing device of FIG. 4.

As illustrated in FIG. 5, the contingent layer body or inactive layers 43 are provided with a pressure monitoring device or system 48 that detects any drop or rise in pressure within the fluid space of the inactive layers. Such a pressure monitoring system could include a pressure transducer, or any other pressure detection/monitoring device or system known in the art. The pressure transducer could be connected to any signaling system or device, such as a flashing light or a warning bell or horn, that is activated when the pressure deviates from a predetermined range. Alternatively, the pressure transducer could be connected to the plant control logic to provide signaling or other functionality.

The pressure drop in the inactive layer(s) 43 resulting from the cracked cap sheet is detected by the pressure monitoring system 48 and, as indicated at 49 in FIG. 5, a signal is provided to the system operators.

Similarly, in the event that a crack forms in the parting sheet separating an inactive layer 43 from the outermost active layer 46, the pressure in the fluid space of the inactive layer would rise due to the resulting leak path (represented by arrow 50 in FIG. 5) to match the pressure of the outermost active layer. This failure would also be detected by the inactive layer pressure monitoring system 48.

The contingent layer body or inactive layers 43 are provided with an emergency pressure relief device, indicated at 51 in FIG. 5 and in general at 51 in FIG. 4, to vent the fluid space of the inactive layer(s) to atmosphere or to a disposal system in the event that a preset pressure is exceeded to prevent over pressurization. Examples of disposal systems include, but are not limited to, flares, incinerators, thermal oxidizers or generator recovery systems. As an example only, with reference to FIG. 4, the emergency pressure relief device 51 may include a pressure-activated valve 52 or similar component that is positioned on the distal end of piping 53 that is connected to a nozzle of a header 55 of the inactive layers 43. As a result, the piping 53 and header 55 are open to the interior fluid spaces of the inactive layers 43. As an example only, the pressure-activated valve 52 could include a check valve, a pressure regulator or other pressure-operated valve or device known in the art. The pressure-activated valve automatically opens to relieve pressure when the pressure in one or more of the inactive layers 43 exceed a set value, such as the design pressure, or a pressure slightly above the design pressure, of the outermost active layer.

As illustrated in FIG. 5, the contingent layer body or inactive layers 43 also have a low point drain 57 including a valve which may be opened to evacuate the inactive or contingent layers of liquid or other fluid in the case where a leak develops between the outermost active layer and the inactive layers, and the emergency pressure relief device 51 is unable to accommodate the leak. The low point drain valve may be opened manually, automatically or remotely. The low point drain can also be used at the inlet to charge the fluid space of the contingent layers with pressure.

In an alternative embodiment of the plate fin fluid processing device of the disclosure, the inactive layers 43 of the contingent layer body of the plate fin heat exchanger of FIG. 4 define a fluid space that is sealed with respect to the atmosphere with at least a partial vacuum so that the fluid space is at a pressure that is below atmospheric pressure. In the event that thermal stress or accumulated thermal fatigue damage causes a crack to form in the outside cap sheet 47 (FIG. 4), the air from the atmosphere enters the fluid space of the contingent layer body so that the pressure therein rises. Such a pressure rise is detected by the inactive layer pressure monitoring system (48 of FIG. 5).

Similarly, in the event that a crack forms in the parting sheet separating an inactive layer 43 from the outermost active layer 46 (FIG. 4), the pressure in the fluid space of the inactive layer would rise due to the resulting leak path (represented by arrow 50 in FIG. 5) to match the pressure of the outermost active layer. This failure would also be detected by the inactive layer pressure monitoring system 48.

Figure 6:
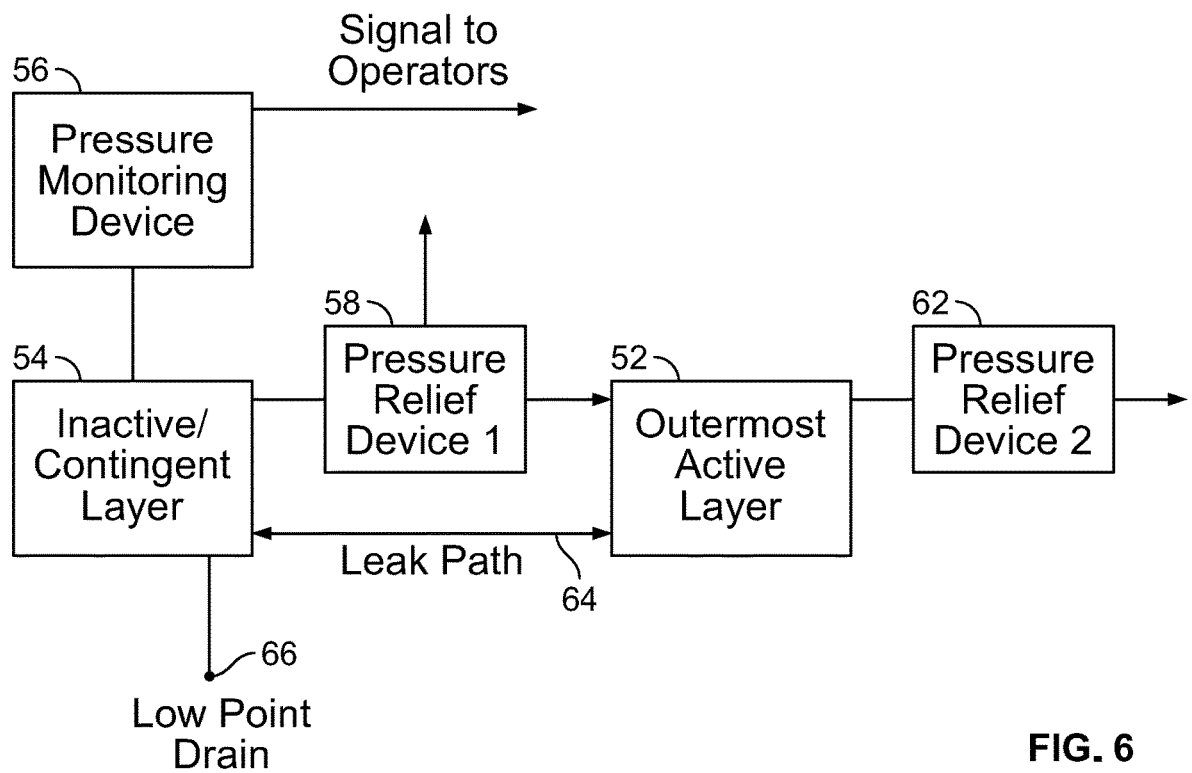
FIG. 6. is a schematic of a second embodiment of the plate fin fluid processing system of the disclosure.

A schematic illustrating the outermost active layer 52 and the neighboring or adjacent contingent layer 54 in an alternative embodiment of the plate fin fluid processing device of the disclosure is presented in FIG. 6. It is to be understood that while a single contingent layer 54 is illustrated, the contingent layer may include multiple layers, with each layer including a fin plate sandwiched between a pair of parting sheets (or a parting sheet and a cap sheet). The fins of the contingent layers are at least equal in strength (design pressure) to the weakest fins in the adjacent outermost active layer.

Furthermore, while FIG. 6 illustrates the adjacent outermost active layer and contingent layer at one end of the heat exchanger, it is to be understood that the other end of the heat exchanger will also include adjacent outermost active and contingent layers that operate in the manner described below for FIG. 6.

A fluid space exists for the outermost active layer and each contingent layer. When the term "fluid space" is used below with regard to the contingent layer, it is to be understood that it encompasses the fluid spaces of all of the contingent layers on one side of the heat exchanger.

As illustrated in FIG. 6, a pressure monitoring device 56 is in communication with the fluid space of the contingent layer 54. As an example only, the pressure monitoring device could be a pressure transducer. The pressure transducer could be connected to any signaling system or device, such as a flashing light or a warning bell or horn. Alternatively, the pressure transducer could be connected to the plant control logic.

A first pressure relief device 58 is connected between the contingent layer 54 and the outermost active layer 52, in the manner described below. In addition, a second pressure relief device 62 is connected to the fluid space of the outermost active layer 52. As an example only, the second pressure relief device 62 may include a pressure-activated valve or similar device that is positioned in the piping that is connected to a nozzle of a header of the active layer 52.

In the case where a leak, indicated at 64 in FIG. 6, develops between the outermost active layer 52 and the contingent layer 54 of the heat exchanger, the fluid space of the contingent layer becomes pressurized. When the pressure exceeds a predetermined level, the pressure monitoring device presents a warning to the operators that a leak into the contingent layer has occurred. This may serve as a signal that a significant portion of the life of the heat exchanger has been consumed.

The first pressure relief device 58 activates to allow fluid to flow from the contingent layer 54 to the outermost active layer 52 (or other related destination as described below) whenever the pressure in the contingent layer exceeds a predetermined level or reaches a predetermined set point, such as the pressure in the outermost active layer. As an example only, the pressure relief device 58 could include a check valve, a pressure regulator or other pressure-operated valve or device known in the art.

The second pressure relief device 62 may take the form of a check valve, a pressure regulator or other pressure-operated valve or device known in the art. The second pressure relief device automatically opens to relieve pressure when the pressure in the outermost active layer 52 exceeds a set value, such as the design pressure, or a pressure slightly above the design pressure, of the outermost active layer.

The contingent layer 54 also has a low point drain 66 including a valve which may be opened to evacuate the contingent layer of liquid or other fluid in the case where a leak develops between the outermost active layer and the contingent layer, and the first pressure relief device 58 is unable to accommodate the leak. The low point drain valve may be opened manually, automatically or remotely.

Figure 7:
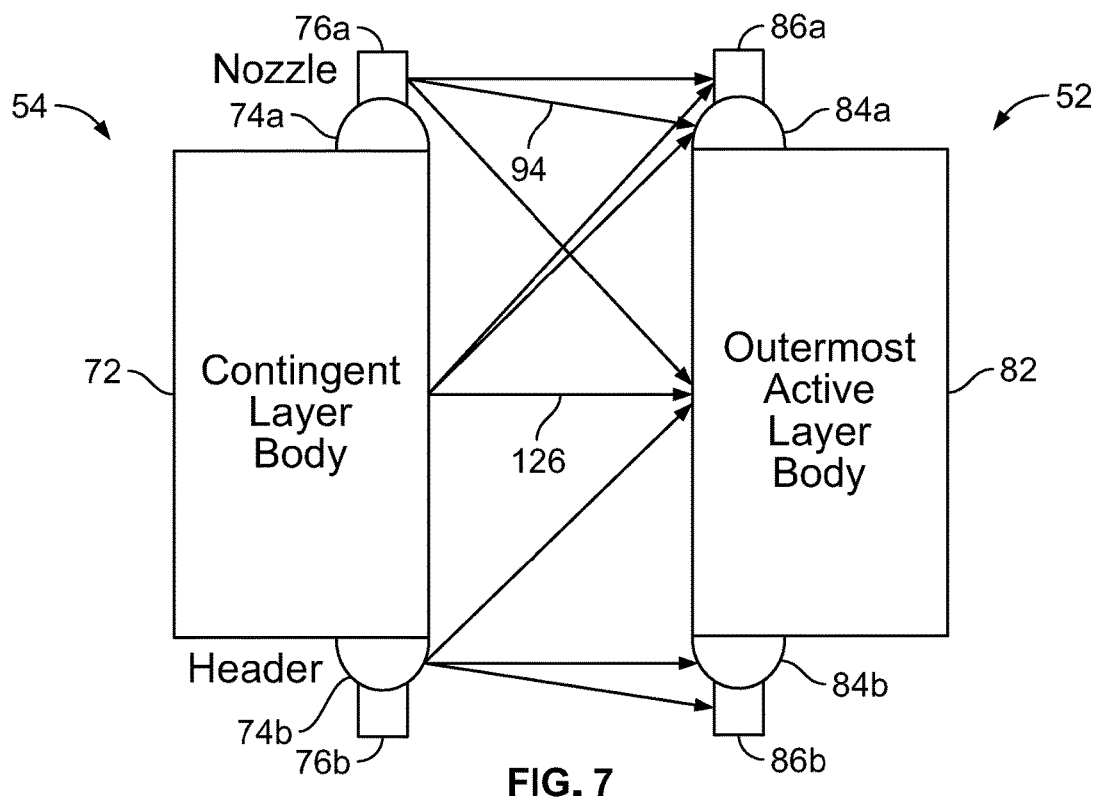
FIG. 7 is a diagram illustrating examples of the leak containment and pressure relief paths in various embodiments of the plate find fluid processing system of FIG. 6.

Turning to FIG. 7, the contingent layer, indicated in general at 54, includes a contingent layer core or body 72 (which may include multiple layers, as described above) equipped with a pair of headers 74a and 74b, each having one or more nozzles 76a and 76b, respectively. The headers 74a and 74b are each in fluid communication with an inlet or an outlet of the contingent layer body. The headers 74a and 74b and nozzles 76a and 76b are required for filling and draining the contingent layer body 72 with water for pressure testing, and, since the contingent layers are not in use during standard operating conditions for the heat exchanger, the openings of the nozzles may be sealed after such testing, or may instead be connected to a pressure monitoring device, a first pressure relief device or a low point drain.

Similar to the contingent layer 54, the outermost active layer, indicated in general at 52 in FIG. 7, includes an outermost active layer core or body 82 (which includes the outermost active layer) equipped with a pair of headers 84a and 84b, each having one or more nozzles 86a and 86b, respectively. The headers 84a and 84b are each in fluid communication with an inlet or an outlet of the active layer. The headers 84a and 84b and nozzles 86a and 86b provide fluid to, and remove fluid from, the outermost active layers of the heat exchanger, as well as the other active layers of the heat exchanger positioned between the outermost active layers.

As illustrated in FIG. 7, numerous options exist for connecting the contingent layer 54 to the outermost active layer 52 via the first pressure relief device (58 of FIG. 6).

Figure 8:
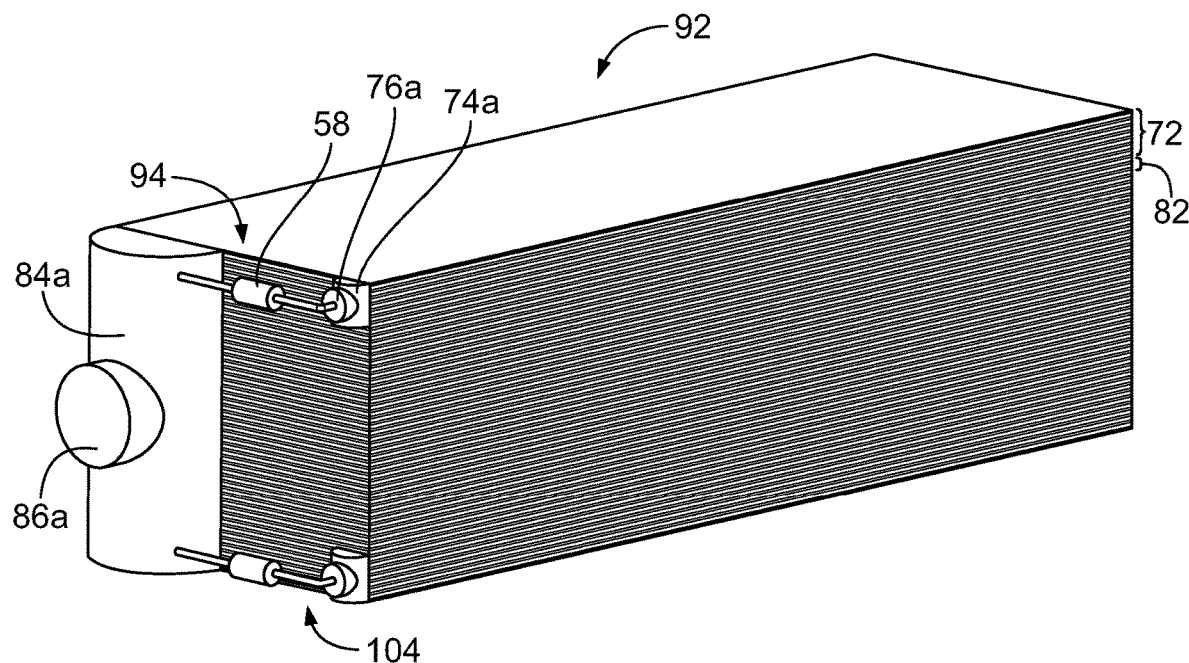
FIG. 8 is a perspective view of a second embodiment of the plate fin fluid processing device of the disclosure.
Figure 9:
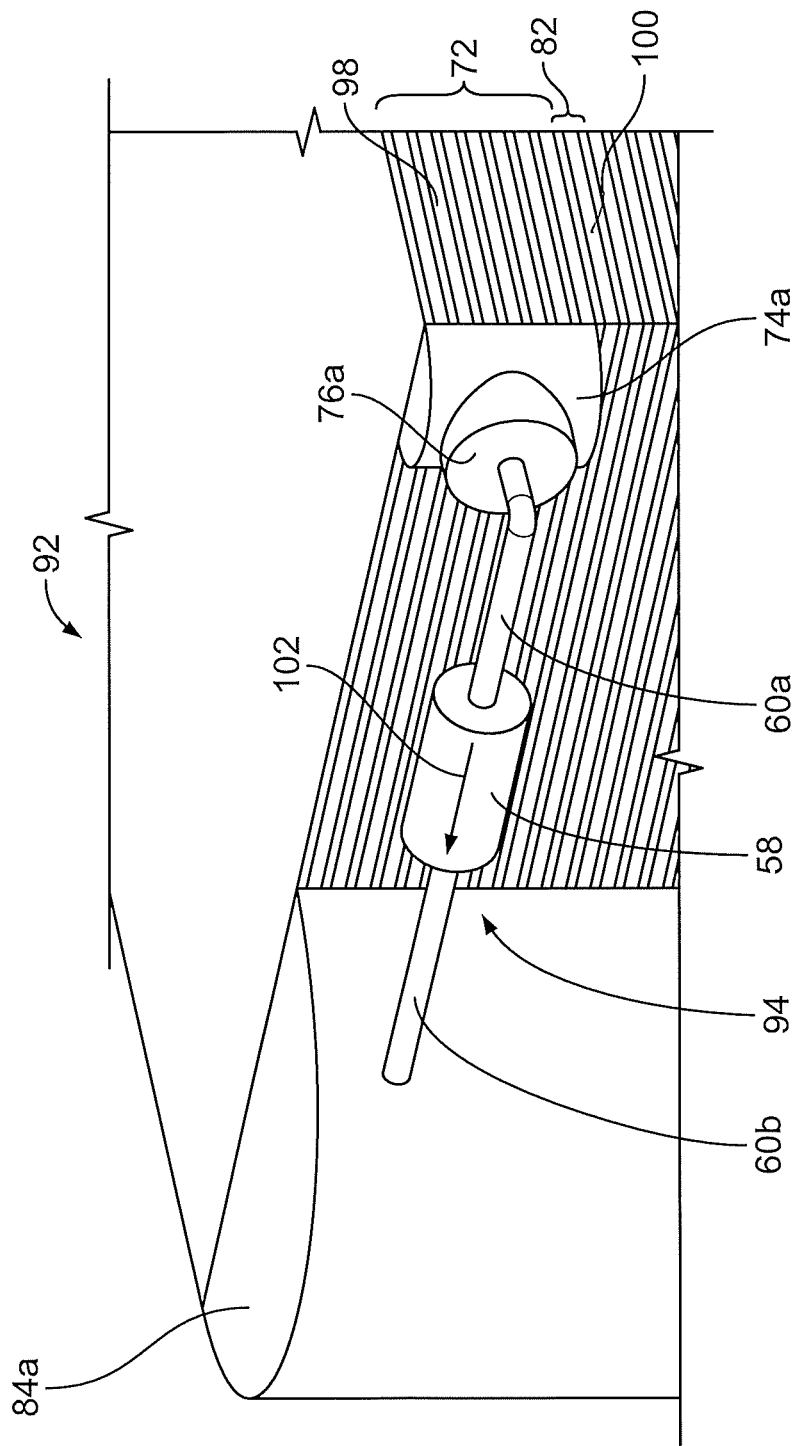
FIG. 9 is an enlarged perspective view of the pressure relief circuit of the plate fin fluid processing device of FIG. 8.

In one embodiment, illustrated in FIGS. 8 and 9, a plate fin heat exchanger 92 features a contingent layer body 72 featuring multiple contingent layers, and an adjacent outermost active layer 82. A pressure relief circuit, indicated in general at 94, features the first pressure relief device 58 and fluid connecting lines 60a and 60b that connect to a port in the nozzle 76a of the contingent layer header 74a and a port in the header 84a of the outermost active layer 82. This is also shown as arrow 94 in FIG. 7. With reference to FIG. 9, the bars 98 of the contingent layers of contingent layer body 72 and the bars 100 of the outermost active layer body 82 are configured so that the fins of the contingent layers are open solely to the contingent layer header 74a (and possibly another header not shown) and the fins of the outermost active layer are only open to the header 84a (and another header not shown). Notably, other than as allowed by the pressure relief circuit 94, the contingent layers of the contingent layer body 72 are not in fluid communication with the header 84a.

As described above, when a leak develops between the outermost active layer body 82 and the contingent layer body 72, the pressure within the contingent layer body rises. When this pressure exceeds the pressure within the outermost active layer body, as detected by the pressure relief device 58 based on the pressure differential between the header 84a and the contingent layer body 72, the pressure relief device opens so that fluid from the contingent layer body flows to the header 84a (as indicated by arrow 102 in FIG. 9 and arrow 94 in FIG. 7).

With reference to FIG. 8, a similar arrangement exists, as indicated in general at arrow 104, for the contingent layer body and the outermost active layer at the opposite end of the heat exchanger 92.

Figure 10:
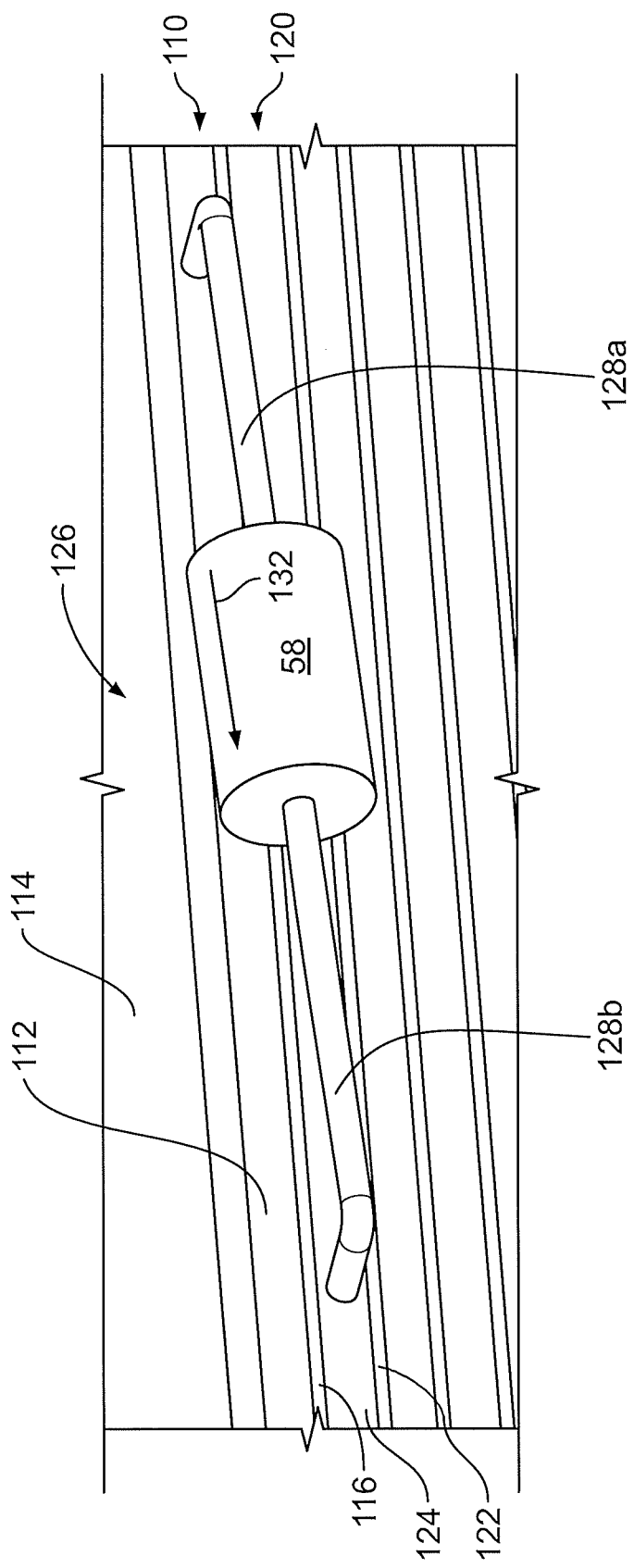
FIG. 10 is a perspective view of a pressure relief circuit in a third embodiment of the plate fin fluid processing device of the disclosure.

In another embodiment, illustrated in FIG. 10, a contingent layer, indicated in general at 110, features a fin plate (not visible in FIG. 10) sandwiched between cap plate 114 and parting sheet 116 and bordered on one side by bar 112. An adjacent outermost active layer, indicated in general at 120, features a fin plate (not visible in FIG. 10) sandwiched between parting sheet 116 and parting sheet 122 and bordered on one side by bar 124.

A pressure relief circuit, indicated in general at 126, features the first pressure relief device 58 and fluid connecting lines 128a and 128b that connect to ports formed in side bars 112 and 124. This is also shown as arrow 126 in FIG. 7.

As described above, when a leak develops between the outermost active layer 120 and the contingent layer 110, the pressure within the contingent layer rises. When this pressure exceeds the pressure within the outermost active layer, as detected by the pressure relief device 58 based on the pressure differential between the fluid spaces of the two layers, the pressure relief device opens so that fluid from the contingent layer flows to the outermost active layer (as indicated by arrow 132 in FIG. 10 and arrow 126 in FIG. 7).

As illustrated by the remaining arrows in FIG. 7, in alternative embodiments, the first pressure relief device (58 of FIG. 6) can connect to the contingent layer body via a nozzle, header, or the contingent layer main body, and can connect to the outermost active layer via a nozzle, header, outermost active layer main body, other layers containing the same stream as the outermost active layer, or upstream or downstream piping associated with the outermost active layer.

As an example only, the heat exchangers described above could be designed to accommodate fluid flow pressures in the range of 30 psi to 1300 psi. As another example, the heat exchanger could accommodate fluid flow pressures between 200 to 300 psi. In some embodiments, the first pressure relief device may be configured to activate any time the contingent layer fluid space is higher pressure than the heat exchanger design pressure.

As a result, embodiments of the plate fin fluid processing device of the disclosure provide a device and method of detecting when the cap sheet (or outside sheet) of an inactive layer cracks, which is an indicator that a substantial portion of the operational life of the heat exchanger has been consumed. In addition, an indication is provided if a parting sheet separating an inactive layer and an active layer is compromised.

Although the present subject matter is described herein with reference to specific structures, methods and examples, this is for purposes of illustration only, and it is understood that the present subject matter is applicable to a large range of devices and systems that may differ in particular configuration and appearance while still employing this subject matter.

While the preferred embodiments of the invention have been shown and described, it will be apparent to those skilled in the art that changes and modifications may be made therein without departing from the spirit of the invention, the scope of which is defined by the appended claims.

What is claimed is:

1. A plate fin fluid processing device comprising:
   a. a plurality of active layers, where each active layer includes a fin plate sandwiched between parting sheets so that an active fluid space is defined between the parting sheets, and where the plurality of active layers includes an outermost active layer having an inlet and an outlet;
   b. a contingent layer body positioned adjacent to the outermost active layer and including a cap sheet that defines an exterior surface of the plate fin fluid processing device, where the exterior surface is exposed to atmosphere, said contingent layer body defined by at least one contingent layer, where each at least one contingent layer includes a fin plate positioned between a pair of parting sheets or a parting sheet and the cap sheet so that a fluid space is defined for each at least one contingent layer, where the fluid space is sealed with respect to the atmosphere and wherein the contingent layer body is pressurized with an inert gas to a single predetermined pressure that is above atmospheric pressure or is depressurized to the single predetermined pressure below atmospheric pressure with the fluid space of each at least one contingent layer containing the single predetermined pressure;
   c. a pressure monitoring system in communication with the fluid space of each at least one contingent layer of the contingent layer body, wherein the pressure monitoring system is configured to detect the single predetermined pressure and a change in the single predetermined pressure; and
   d. a pressure relief device configured to release a pressure within the fluid space of one of the at least one contingent layer if a preset pressure is exceeded.

2. The plate fin fluid processing device of claim 1 wherein the single predetermined pressure is above atmospheric pressure but below an operating pressure of a stream of the outermost active layer.

3. The plate fin fluid processing device of claim 2 wherein the single predetermined pressure is approximately 100 psi.

4. The plate fin fluid processing device of claim 3 wherein the inert gas is nitrogen.

5. The plate fin fluid processing device of claim 1 wherein the inert gas is a gas selected from the group consisting of nitrogen and dry air.

6. The plate fin fluid processing device of claim 1 wherein the contingent layer body includes a low point drain.

7. The plate fin fluid processing device of claim 1 wherein the contingent layer body includes a plurality of contingent layers, with each contingent layer including a fin plate positioned between a pair of parting sheets or a parting sheet and the cap sheet.

8. The plate fin fluid processing device of claim 7 wherein the pressure relief device is configured release pressures within all of the fluid spaces of the plurality of contingent layers if the preset pressure is exceeded.

9. The plate fin fluid processing device of claim 1 wherein the pressure relief device includes a contingent layer header in fluid communication with the fluid space of the contingent layer body and a pressure-activated valve in fluid communication with the contingent layer header.

10. The plate fin fluid processing device of claim 1 wherein the fluid space of the contingent layer body contains a partial vacuum.

11. A plate fin fluid processing device comprising:
   a. a plurality of active layers, where each active layer includes a fin plate sandwiched between parting sheets so that an active fluid space is defined between the parting sheets, and where the plurality of active layers includes an outermost active layer having an inlet and an outlet;
   b. a contingent layer body positioned adjacent to the outermost active layer and including a cap sheet that defines an exterior surface of the plate fin fluid processing device, where the exterior surface is exposed to atmosphere, said contingent layer body defined by at least one contingent layer, where each contingent layer includes a fin plate positioned between a pair of parting sheets or a parting sheet and the cap sheet so that a fluid space is defined for each at least one contingent layer, where the fluid space is sealed with respect to the atmosphere and is pressurized to a single predetermined pressure that is above atmospheric pressure or is depressurized to the single predetermined pressure below atmospheric pressure with the fluid space of each at least one contingent layer containing the single predetermined pressure;
   c. a pressure monitoring system in communication with the fluid space of each at least one contingent layer of the contingent layer body, wherein the pressure monitoring system is configured to detect the single predetermined pressure and a change in the single predetermined pressure; and
   d. a pressure relief device configured to release a pressure within the contingent layer body if a preset pressure is exceeded within the contingent layer body.

* * * * *